United States Patent

Lew

[11] Patent Number: 4,776,222
[45] Date of Patent: Oct. 11, 1988

[54] IMPULSE SENSOR WITH MECHANICAL PREAMPLIFICATION

[76] Inventor: Hyok S. Lew, 7890 Oak St., Arvada, Colo. 80005

[21] Appl. No.: 31,901

[22] Filed: Mar. 30, 1987

Related U.S. Application Data

[63] Continuation-in-part of Ser. No. 920,977, Oct. 20, 1986, Ser. No. 922,850, Oct. 24, 1986, Ser. No. 12,680, Feb. 9, 1987, and Ser. No. 31,902, Mar. 30, 1987.

[51] Int. Cl.$^4$ .................. G01L 1/16; G01F 1/32
[52] U.S. Cl. .................. 73/862.68; 73/861.22; 73/861.23; 73/861.24
[58] Field of Search .......... 73/861.22, 861.23, 861.24, 73/862.68, DIG. 4; 310/328, 324, 338

[56] References Cited

U.S. PATENT DOCUMENTS

| | | | |
|---|---|---|---|
| 2,250,496 | 7/1941 | Postlethwaite | 310/338 |
| 4,258,565 | 3/1981 | Sawayama et al. | 73/141 R |
| 4,262,544 | 4/1981 | Herzl | 73/861.24 |
| 4,625,564 | 12/1986 | Murakami et al. | 73/861.24 |

Primary Examiner—Stewart J. Levy
Assistant Examiner—Robert P. Bell

[57] ABSTRACT

This invention discloses an impulse sensor that detects change in force imposed on a force receiving member extending from the impulse sensor, which comprises a force receiving member extending from a thin flange forming a portion of the container vessel enclosing at least two Piezo electric elements wherein the first of the two Piezo electric elements disposed in an off-set relationship with respect to the central axis of the force receiving member is under a pressurized contact with the thin flange, while the second of the two Piezo electric elements disposed in a symmetric arrangement about the central axis of the force receiving member is under a pressurized contact with a rigid portion of the container vessel. The first Piezo electric element detects the impulses received by the force receiving member and other noise impulses transmitted through the container vessel wall while the second Piezo electric element detects the same noise impulses as those detected by the first Piezo electric element. The two electric signals respectively generated by the two Piezo electric elements are combined and processed in such a way that the noises are cancelled and the signals representing the impulses received by the force receiving member are delivered.

8 Claims, 2 Drawing Sheets

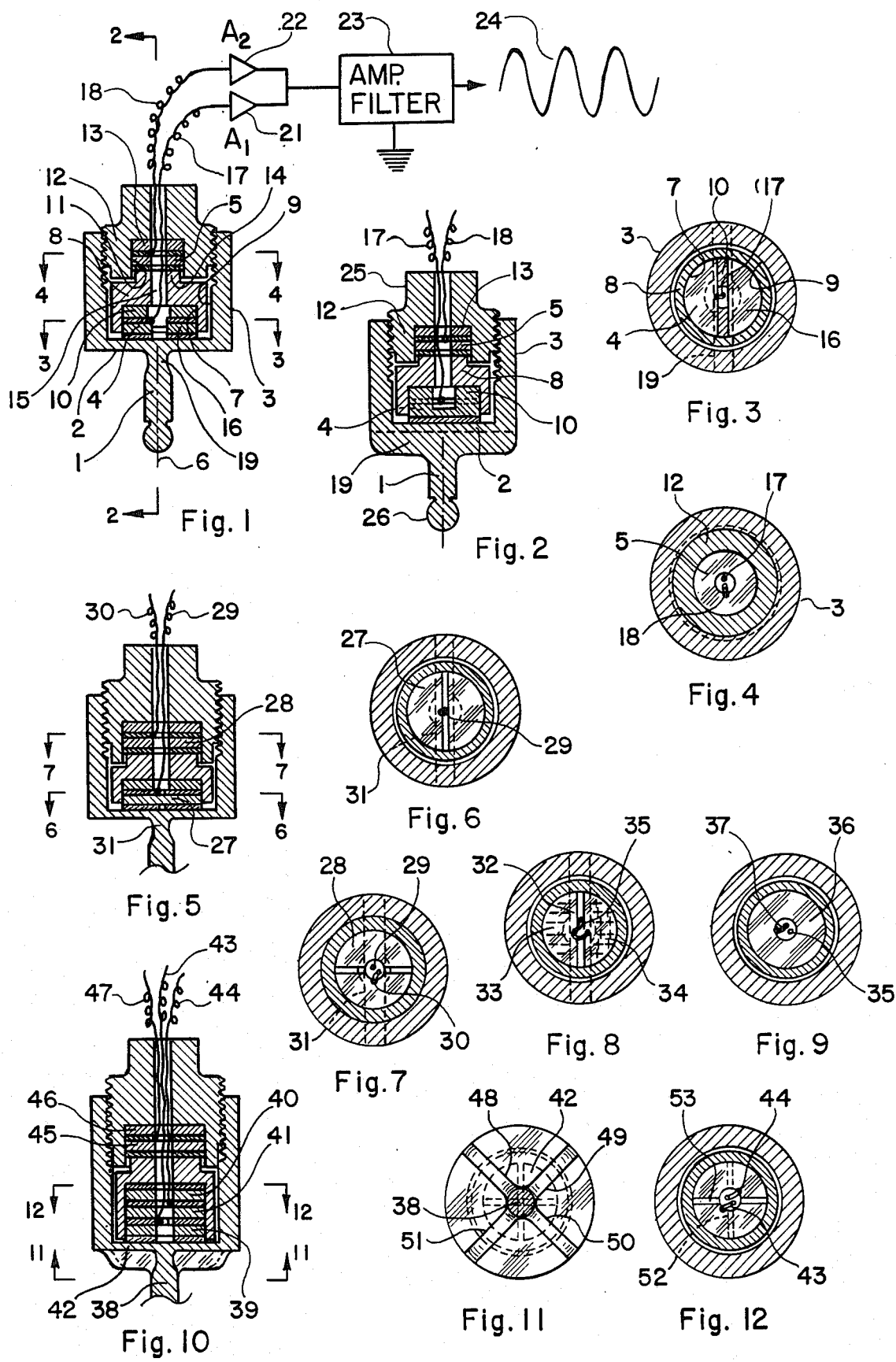

4,776,222

IMPULSE SENSOR WITH MECHANICAL PREAMPLIFICATION

BACKGROUND OF THE INVENTION

This is a continuation-In-Part application to patent applications Ser. No. 920,977 entitled "Tandem Wing Universal Vortex Shedding Flowmeter" filed on Oct. 20, 1986; Ser. No. 922,850 entitled "Vortex Shedding Flowmeter with Lever Action Signal Amplification" filed on Oct. 24, 1986; Ser. No. 012,680 entitled "Vortex Shedding Flowmeter with Mechanically Amplifying Pressure sensor" filed on Feb. 9, 1987; and Ser. No. 031,902 entitled "Three-in-one Vortex Shedding Flowmeter" filed Mar. 30, 1987.

Flowmeter technology plays a key role in bringing forth automation in the chemical, mineral, pharmaceutical and other processing industries. It appears increasingly clear that future flow measurement technology will be dominated by three different high technology flowmeters; The vortex shedding flowmeter providing measurements of volumetric flow, the Coriolis force flowmeter providing measurements of mass flow, and a super positive displacement flowmeter that has not been developed into practice at the present time. It has been repeatedly proven and demonstrated that the best method for measuring the vortex shedding frequencies in the construction and operation of the vortex shedding flowmeters is to detect the fluctuations in the fluid pressure or streamlines created by the vortices, which fluctuations are best measured by a force or impulse sensor that detects the fluctuating forces generated by the vortices. Therefore, success or failure of an advanced concept and design on a vortex shedding flowmeter depends on the level of excellence in the design of the force or impulse sensor.

BRIEF SUMMARY OF THE INVENTION

The primary object of the present invention is to provide an impulse sensor that has a very high signal to noise ratio.

Another object is to provide an impulse sensor that includes means for mechanically preamplifying the impulse signals and means for electronically canceling noise signals.

A further object is to provide an impulse sensor including a force transmitter member secured to a thin wall forming a portion of the container vessel housing at least two Piezo electric elements.

Yet another object is to provide an impulse sensor including at least two Piezo electric elements wherein the first Piezo electric element is disposed asymmetrically about the central axis of the force transmitter member is under a pressurized contact with the thin wall forming a portion of the container vessel and the second Piezo electric element disposed symmetrically about plane including the central axis of the force transmitter member is under a pressurized contact with a rigid portion of the container vessel housing the two Piezo electric elements.

Yet a further object is to provide an impulse sensor wherein the first Piezo electric element detects impulse signals and noises while the second Piezo electric element detects noises only.

Still another object is to provide an impulse sensor wherein the signals from the two Piezo electric elements are combined to cancel the noises and extract the pure signals.

Still a further object is to provide an impulse sensor that is compatible with very low and high temperatures as well as high pressures.

An additional object is to provide an impulse sensor usable in conjunction with an advanced vortex shedding flowmeter capable of measuring very low velocities of fluid flow.

These and other objects of the present invention will become clear as the description thereof proceeds.

BRIEF DESCRIPTION OF THE FIGURES

The present invention may be described with a great clarity and specificity by referring to the following figures:

FIG. 1 illustrates a cross section of an embodiment of the impulse sensor constructed in accordance with the principles of the present invention.

FIG. 2 illustrates another cross section of the embodiment shown in FIG. 1.

FIG. 3 illustrates a further cross section of the embodiment shown in FIG. 1.

FIG. 4 illustrates yet another cross section of the embodiment shown in FIG. 1.

FIG. 5 illustrates a cross section of another embodiment of the impulse sensor of the present invention.

FIG. 6 illustrates another cross section of the embodiment shown in FIG. 5.

FIG. 7 illustrates a further cross section of the embodiment shown in FIG. 5.

FIG. 8 illustrates a cross section of a further embodiment of the impulse sensor of the present invention, which cross section is equivalent to that shown in FIG. 6.

FIG. 9 illustrates another cross section of the embodiment shown in FIG. 8, which cross section is equivalent to that shown in FIG. 7.

FIG. 10 illustrates a cross section of yet another embodiment of the impulse sensor constructed in accordance with the principles of the present invention.

FIG. 11 illustrates another cross section of the embodiment shown in FIG. 10.

FIG. 12 illustrates a further cross section of the embodiment shown in FIG. 10.

DESCRIPTION OF THE ILLUSTRATED EMBODIMENTS

Figure 13:
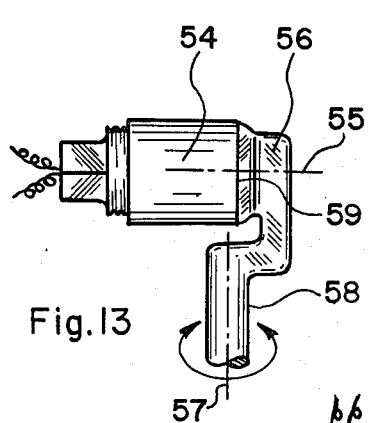
FIG. 13 illustrates an arrangement wherein the impulse sensor of the present invention is used as a torque sensor.

In FIG. 1 there is illustrated a cross section of an embodiment of the impulse sensor constructed in accordance with the principles of the present invention, which cross section is taken along a plane including the central axis of the force transmitter member 1 with one extremity secured to a thin wall or thin flange 2 forming a portion of the container vessel 3 that houses at least two Piezo electric elements 4 and 5. The first Piezo electric element 4 having a semicircular or other shape under a pressurized contact with the thin wall 2 is disposed on a plane generally parallel to the thin wall 2 in an off-set relationship from the central axis 6 of the force transmitter 1, which occupies a first half of the counter bore 7 included in a holder member 8 engaging the cylindrical cavity 9 of the container vessel 3. The first Piezo electric element 4 is separated from the bottom of the counter bore 7 by an electrically insulating disc 10 covering the entire bottom of the counter bore 7. The second Piezo electric element 5 is disposed in a counter bore 11 included in the plug 12 that plugs up the opening of the cavity 9 in a threaded relationship, which Piezo electric element 5 is separated from the bottom of the counter bore 11 by an electrically insulating disc 13 covering the bottom of the counter bore 11. The second Piezo electric element 5 is under a pressurized contact with the end face of the circular post 14 extending from the holder member 8 and engaging the counter bore 11. The combination of the insulator 10, holder member 8, Piezo electric element 5, insulator 13 and the plug 12 includes an axial hole 15 extending therethrough, which hole 15 is disposed generally in line with the central axis 6 of the force transmitter member 1. The other half of the counter bore 7 is filled with a dummy element 16 disposed in a mirror image of the first Piezo electric element 4, which dummy element 16 may be matched to the first Piezo electric element 4 in mass and hardness. One may use an actual or an unpolarized Piezo electric element same as the element 4 for the dummy element 16,; which does not play any role or function in any way as far as electric activity or function is concerned. The only purpose and function of the dummy element 16 is to provide a near perfect symmetric construction of the assembly contained in the container vessel 3 with respect to the central axis 6 of the force transmitter member 1. One of the two electrodes included in the first Piezo electric element 4 is grounded to the thin wall, while the other is connected to the first electric wire. One of the two electrodes included in the second Piezo electric element 5 is grounded to the end face of the circular post 14 while the other is connected to the second electric wire 18. Care should be exercised to connect the two electric wires 17 and 18 to the two electrodes having opposite polarity. It should be understood that, in place of the semicircular Piezo electric element 4, a Piezo electric element of a circular geometry or other shape may be disposed within a counter bore off-set from the central axis 6 of the force transmitter member 1, which replaces the concentric counter bore 7, wherein the necessity of the dummy element 16 is eliminated. Such a modification of the assembly provides a small advantage in terms of saving cost, while it brings forth a disadvantage in terms of quality as the new assembly lacks the perfect axisymmetric construction in the impulse sensor assembly. The thin wall of thin flange 2 may include a rib member 19 extending therefrom a small distance and disposed across the entire diameter thereof. The two Piezo electric elements 4 and 5 are confined under a pressurized state as the plug 12 is threaded into the cavity 3. The rib member 19 provides a structural reinforcement to the thin wall or thin flange 2 enabling it to withstand the pressure exerted thereon by the threaded plug 12. The rib member 19 is disposed on a plane that divides the counter bore 7 into two halves respectively occupies by the real and dummy Piezo electric elements 4 and 16, whereby the rib member 19 does not hinder the pivoting flexing movements of the thin wall or thin flange 2 about an axis coinciding with the line of intersection between the thin flange 2 and the rib member 19, while it reinforces the strength of the thin flange 2 against transverse loadings thereon. It should be understood that the inclusion of the rib member 19 is not necessary when the thin wall or thin flange 2 is thick enough to withstand the pressure loadings thereon by itself.

It is readily recognized that alternating forces exerted on the force transmitting member 1 in directions perpendicular to a plane including the rib 19 flexes the two halves of the thin flange 2 divided by the rib 19 in an alternating mode. As a consequence, the first Piezo electric element 4 disposed asymmetrically about the central axis 6 of the force transmitter member 1 experiences net changes in the pressure thereon in alternating mode and generates alternating electromotive forces in the electric wire 17, which electromotive forces represent forces exerted on the transmitter member 1. The second Piezo electric element 5 disposed symmetrically about the central axis 6 of the transmitter member 1 does not experience any net change in the pressure, as the increase in the pressure on one half thereof is canceled by the decrease in the other half. It is clear that the first Piezo electric element 4 picks up the impulse signals transmitted by the force transmitter member 1, while the second Piezo electric element 5 does not pick up any impulse signals transmitted by the force transmitter member 1. The noises transmitted through the wall of the container vessel 3 are picked up by both Piezo electric elements 4 and 5. Therefore, the electromotive forces genernated by the two Piezo electric elements can be written in the forms $$V_1 = (SIGNAL) + (NOISE)_1, \quad (1)$$

$$V_2 = -(NOISE)_2, \quad (2)$$

where the minus sign in equation (2) originates from the fact that the two electric wires 17 and 18 are connected to two oppositely polarized electrodes. These two signals are amplified by the two preamplifiers 20 and 21 in such a way that $$A_1 V_1 + A_2 = V_2 = A_1 \times (SIGNAL), \quad (3)$$

where the amplification factor $A_1$ and $A_2$ are related to one another by equation $$A_1 (NOISE)_1 - A_2 (NOISE)_2 = 0. \quad (4)$$

The pure impulse signal appearing on the right hand side of equation (3) is processed through an amplifier-filter 23 to obtain refined impulse signals representing the impulses experienced by the force transmitter 1. The present invention employing the two Piezo electric elements respectively disposed asymmetrically and symmetrically about the central axis 6 provides a greater advantage in noise cancellation compared with the force detector of Sawayama et al (U.S. Pat. No. 4,258,565) employing two Piezo electric elements disposed in a mirror image to one another about the central axis 6, because two Piezo electric elements of the present invention disposed in "series" pick up noises of common modes which travel down in the direction parallel to the central axis 6 and, consequently, the "series" arrangement provides better noise cancellation compared with the "parallel" arrangement of the two Piezo electric elements in Sawayama et al wherein noises picked up by two Piezo electric elements lack common modes and, consequently, a poorer noise cancellation is unavoidable. The perfect "series" arrangement of the two Piezo electric elements of the present invention is illustrated in FIGS. 8 and 9. It should be understood that the central axis 6 of the transmitter member 1 should be defined in terms of impulse transmitting function thereof instead of structural arrangement.

In FIG. 2 there is illustrated another cross section of the embodiment shown in FIG. 1, which cross section is taken along plane 2—2 as shown in FIG. 1. The rib 19 extending from the thin wall or thin flange 2 may be disposed over the entire diameter of the thin flange 2 as shown in the illustrated embodiment or partially thereacross. The threaded plug 12 includes a wrench flat 25. The free extremity of the force transmitter member 26 may include means for connecting to the actual member receiving forces, which connection means may be a swivel or pivoting joint, threaded or welded fixed joint or semi-fixed elastic or flex joint. Of course, the actual force receiving member may be made as an integral part of the impulse sensor, that extends directly from the thin flange 2 or rib 19.

In FIG. 3 there is illustrated a further cross section of the embodiment shown in FIG. 1, which cross section is taken along plane 3—3 as shown in FIG. 1. It should be noticed that the Piezo electric element 4 is connected to the electrical wire 17, while the dummy element 16 just fills one half of the counter bore 7.

In FIG. 4 there is illustrated yet another cross section of the embodiment shown in FIG. 1, which cross section is taken along plane 4—4 as shown in FIG. 1. It should be mentioned that the Piezo electric element 5 does not need to be axisymmetric about the central axis 6 of the force transmitter, as it does not pick up impulse signals transmitted by the force transmitter member as long as the Piezo electric element is symmetric about the plane including the rib 19. It is a matter of design to include a seal in the threaded engagement between the container vessel 3 and the plug 12 in order to seal off the Piezo electric elements from the ambient surroundings. Of course, the opening of the axial hole 15 breaking through the end of the plug 12 has to be sealed, too. The threaded closing by the plug 12 may be welded to permanently seal off the interior of the container vessel 3.

In FIG. 5 there is illustrated a cross section of another embodiment of the impulse sensor of the present invention, which has essentially the same construction as the embodiment shown in FIGS. 1, 2, 3 and 4 with one exception. This embodiment employs two Piezo electric elements 27 and 28 having the same shape and size, wherein the electrode of each Piezo electric element connected to the electrical wires 29 or 30 is split into two equal halves. The first Piezo electric element 27 is disposed in such a way that the electrode connected to the electric wire 29 is split along a plane generally including the rib member 31, while the second Piezo electric element 28 is disposed in an arrangement wherein the electrode connected to the electric wire 30 is split along a plane generally perpendicular to the plane including the rib member 31.

In FIG. 6 there is illustrated another cross section of the embodiment shown in FIG. 5, which cross section is taken along plane 6—6 as shown in FIG. 5. It is noticed that only one of the two halves of the split electrode of the first Piezo electric element is connected to the electrical wire 29.

In FIG. 7 there is illustrated a further cross section of the embodiment shown in FIG. 5, which cross section is taken along plane 7—7 as shown in FIG. 5. In this particular embodiment, only one of the two halves of the split electrode of the second Piezo electric element 28 is connected to the electrical wire 30. In this illustrated embodiment, the cross section areas of the functioning half of the two Piezo electric elements 27 and 28 are matched to one another. It should be understood that one may employ a combination of the first Piezo electric element with a split electrode as shown in FIG. 6 and the second Piezo electric element with unsplit electrode as shown in FIG. 9 in constructing an impulse sensor assembled in essentially the same way as that shown in FIG. 5.

In FIG. 8 there is illustrated a cross section of a further embodiment of the impulse sensor having essentially the same construction as that shown in FIG. 5 with one exception being the incorporation of the different Piezo electric elements, which cross section is equivalent to that shown in FIG. 6. The first Piezo electric element 32 employed in place of the Piezo electric element 27 shown in FIG. 5 includes two halves of opposite polarization 33 and 34, which two halves may include two separate electrodes connected to the common electric wire 35 as shown in the illustrated embodiment or a single common electrode connected to the electrical wire 35. These two halves of opposite polarization generate impulse signals of the same sign and noises of opposite signs. As a consequence, the electromotive forces delivered to the electrical wire 35 from the Piezo electric element 32 include the maximum amount of the impulse signals and the minimum amount of noise.

In FIG. 9 there is illustrated another cross section of the embodiment of the impulse sensor having a cross section shown in FIG. 8. The cross section shown in FIG. 9 is equivalent to that shown in FIG. 7, which cross section shows the arrangement of the second Piezo electric element 36 employed in place of the Piezo electric element 28 shown in FIG. 5. The Piezo electric element 36 of circular shape with unsplit electrode connected to the electrical wire 37 has the same polarization over the entire circular area and, consequently, it delivers electromotive forces to the electrical wire 37 which include the maximum amount of noise and zero or a very small amount of impulse signals. It is evident from equations (3) and (4) that the combination of the two Piezo electric elements respectively shown in FIGS. 8 and 9 yields impulse signals of maximum strength. It should be understood that the first Piezo electric element 32 shown in FIG. 8 may be employed in combination with the second Piezo electric element shown in FIG. 7 in place of the element shown in FIG. 9. The impulse sensors of the present invention shown in FIGS. 1, 5 and 8-9 are for measuring impulses in directions approximately perpendicular to the plane along which the first Piezo electric element under a pressurized contact with the thin flange is split, as these impulse sensors do not detect impulses in directions generally parallel to the plane along which the first Piezo electric element is split.

In FIG. 10 there is illustrated a cross section of an embodiment of the impulse sensor that is capable of detecting impulses exerted on the force transmitter member 38 in all directions perpendicular thereto, which impulse sensor has essentially the same construction as the embodiment shown in FIG. 5 with the exceptions related to the Piezo electric elements. In place of the single electrode adjacent to the thin flange disposed in an asymmetric relationship with respect to the central axis of the force transmitter member as shown in FIGS. 1, 5, or 8, a combination of the first and second Piezo electric elements 39 and 40 sandwiching an electrical insulator disc 41 in a stacked assembly is disposed adjacent to the thin wall or thin flange 42 under a pressurized contact therewith. The planes respectively comprising the boundary dividing the electrically functioning half from the electrically nonfunctioning dummy half or dividing two halves of opposing polarities in the first and second Piezo electric elements 39 and 40 are disposed perpendicular to one another in the stacked assembly of the two Piezo electric elements. The electrodes of the two Piezo electric elements 39 and 40 adjacent to the electrical insulator disc 41 are respectively connected to the electrical wires 43 and 44. The third Piezo electric element 45 is disposed away from the thin wall or thin flange 42 in an arrangement symmetric about the central axis of the force transmitter member 38, wherein one electrode adjacent to the electrical insulator disc 46 is connected to the electrical wire 47.

In FIG. 11 there is illustrated another cross section of the embodiment shown in FIG. 10, which cross section taken along plane 11—11 as shown in FIG. 10 illustrates the four rib members 48, 49, 50 and 51 extending a short distance from the thin flange 42, which are disposed in an axisymmetric radiating pattern from the force transmitter member 38 in four different directions. The pattern in which the four rib members 48, 49, 50 and 51 are distributed, is rotated by 45 degrees from the pattern in which the boundary planes dividing the Piezo electric elements 39 and 40 are distributed. The rib members 48, 49, 50 and 51 may be omitted by employing a thicker thin wall or thin flange 42.

In FIG. 12 there is illustrated a cross section of the embodiment shown in FIG. 10, which cross section taken along plane 12—12 illustrates the orthogonal planes 52 and 53 respectively dividing the two halves of the Piezo electric elements 39 and 40. The component of the impulse in the direction perpendicular to the plane 52 is determined by combining the two signals from the electric wires 43 and 47 per rules described in conjunction with FIG. 1, while the component of the impulse in the direction perpendicular to the plane 53 is determined by combining the two signals from the electrical wires 44 and 47. The total impulse is obtained from the aforementioned two components by the Pythagorean theorem. The first and second Piezo electric elements 39 and 40 may have the construction shown in FIGS. 3, 6, or 8, while the third Piezo electric element 45 may have the construction shown in FIG. 4, 7, or 9.

In FIG. 13 there is illustrated an arrangement that employs the impulse sensor of the present invention illustrated in FIGS. 1, 5 or 8-9 as a torque sensor. The impulse sensor 54 is secured in a fixed position in such a way that the central axis 55 of the force transmitter member 56 is generally perpendicular to the pivoting axis 57 of the torsion member 58 and the thin flange 59 of the impulse sensor 54 generally coincides with the pivoting axis 57.

Figure 14:
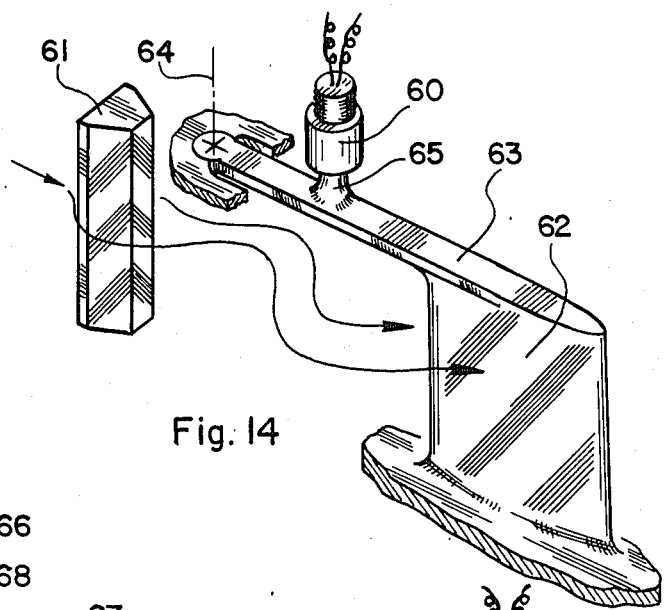
FIG. 14 illustrates an embodiment of the vortex shedding flowmeter employing the impulse sensor of the present invention.

In FIG. 14 there is illustrated an impulse sensor 60 of the present invention employed in a vortex shedding flowmeter invented by the inventor of the present invention. The bluff body 61 rigidly disposed across a section sheds vortices from two sides thereof in an alternating pattern, which vortices create sinuating streamlines generating alternating lift forces on the wing 62 extending from the wall of the flow passage across another cross section of the flow passage. The free extremity of the wing 62 is connected on one extremity of the lever member disposed generally parallel to the direction of the fluid flow and secured at the other extremity in a pivotable relationship about a pivoting axis 64. The force transmitter member 65 extending from the thin flange of the impulse sensor 60 affixed to the wall of the flow passage is connected to the lever member 63 intermediate the two extremities thereof in a perpendicular arrangement. The alternating lift forces on the wing 62 generated by the sinuating stream lines are transmitted to the force transmitter member 65 in an amplified mode due to the lever action provided by the lever member 63. This design of the vortex shedding flowmeter is one of the best for measuring fluid velocities of low values.

Figure 15:
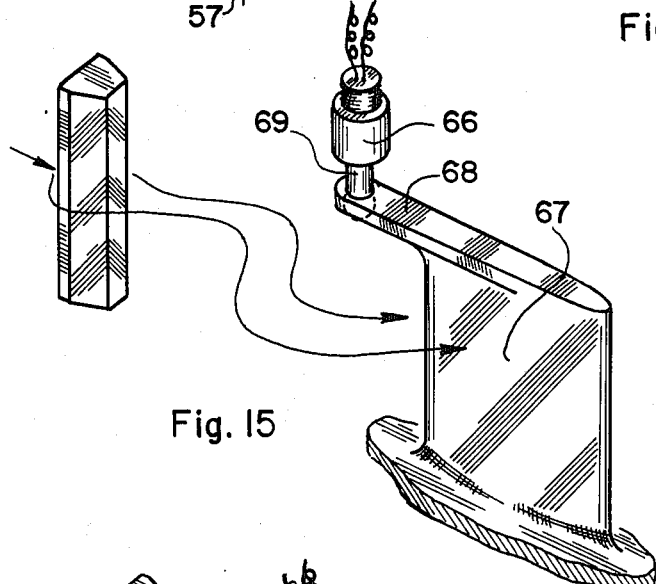
FIG. 15 illustrates another embodiment of the vortex shedding flowmeter employing the impulse sensor of the present invention.

In FIG. 15 there is illustrated another vortex shedding flowmeter invented by the inventor of the present invention that employs an impulse sensor 66 of the present invention. The vortex sensing wing 67 extending from the wall of the flow passage includes an extension 68 extending from the free extremity of the wing 67 in the direction of the fluid flow. The force transmitting member 69 of the impulse sensor 66 is connected to the extremity of the extension 68 by a pivoting or swivel joint as shown in the illustrated embodiment or by a fixed or semi-fixed joint. This design provides a less expensive vortex shedding flowmeter compared with that shown in FIG. 14, while it compromises on the ability to measure very low fluid velocities. It is clear that the free end of the vortex sensing wing may be connected directly to the force transmitter member of the impulse sensor by a pivoting or swivel joint without including the extension 68.

Figure 16:
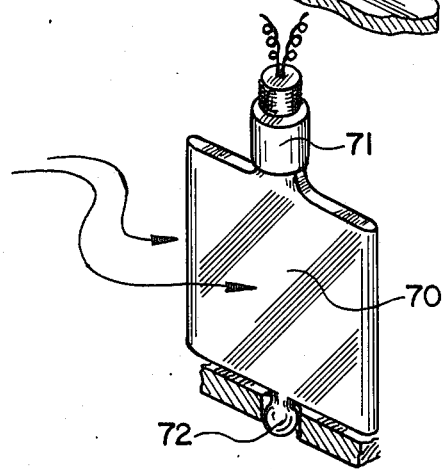
FIG. 16 illustrates a further embodiment of the vortex shedding flowmeter employing the impulse sensor of the present invention.

In FIG. 16 there is illustrated another embodiment of the vortex sensing wing 70 invented by the inventor of the present invention. The one extremity of the wing 70 is directly connected to the thin flange of the impulse sensor 71 in a fixed or semi-fixed joint, while the other extremity is pivotably secured to the wall of the flow passage by a swivel joint 72.

Figure 17:
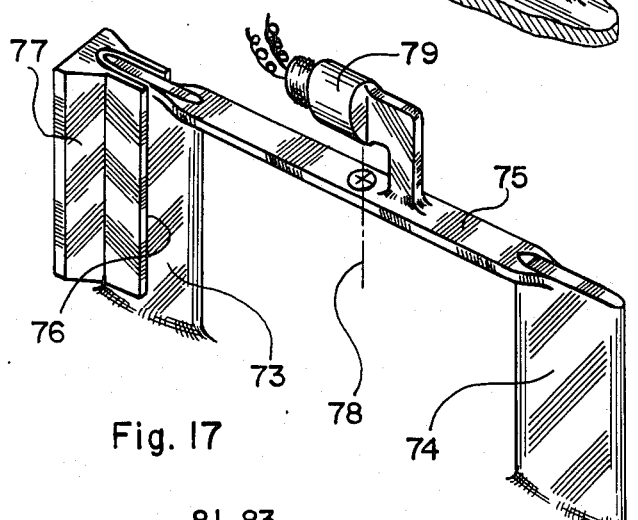
FIG. 17 illustrates yet another embodiment of the vortex shedding flowmeter that employs the impulse sensor of the present invention.

In FIG. 17 there is illustrated a further vortex shedding flowmeter employing an impulse sensor of the present invention, which employs two vortex sensing wings 73 and 74 extending from the wall of the flow passage wherein the free extremities of the two wings are connected to one another by a lever member 75 disposed parallel to the direction of the fluid flow. The two wings disposed in tandem are spaced from one another in such a way that the lift force on the first wing 73 engaging a slot 76 included in the bluff body 77, which lift force is created by the differential pressure on two sides of the bluff body, and the lift force on the second wing 74 created by the action of sinuating streamlines produce alternating couples of torque about the pivoting axis 78. The torque about the pivoting axis 78 to which the lever member 75 may be pivotally secured, is detected by the impulse sensor 79 installed as a torque sensor. It is evident that an impulse sensor may be connected to the lever member 75 in an arrangement as shown in FIG. 14 instead of the illustrated embodiment of FIG. 17.

Figure 18:
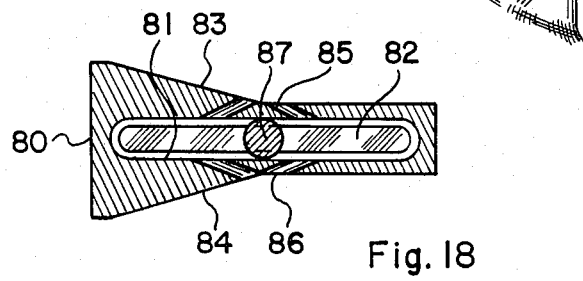
FIG. 18 illustrates an embodiment of the insertion type vortex shedding flowmeter that employs the impulse sensor of the present invention.

In FIG. 18 there is illustrated a cross section of an insertion type vortex shedding flowmeter invented by the inventor of the present invention, which cross section is taken along a plane perpendicular to the longitudinal axis of the bluff body 80 secured to the wall of flow passage and extending across a cross section of the flow passage. The bluff body 80 includes a planar cavity 81 confining a pressure sensor panel 82 in a spaced relationship. The two sides of the pressure sensor panel 82 are respectively subjected to fluctuating fluid pressures on the two sides 83 and 84 of the bluff body 80 by means of two sets 85 and 86 of pluralities of pressure transmitting holes respectively disposed through the two side-walls of the planar cavity 81. One extremity of the pressure sensor panel 82 is secured to one extremity of the bluff body 80, while the other extremity is coupled to the force transmitter member 87 extending from the impulse sensor affixedly secured to the other extremity of the bluff body 80. The alternating pressure loading on the pressure sensor panel 82 generates vortex signals in the form of alternating electromotive forces from the impulse sensor.

Figure 19:
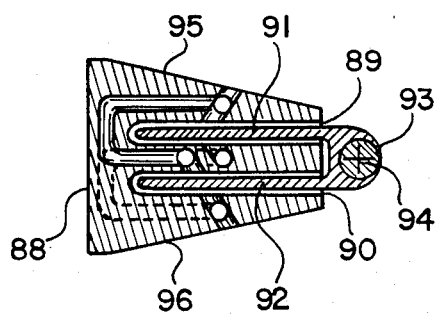
FIG. 19 illustrates another embodiment of the insertion type vortex shedding flowmeter employing the impulse sensor of the present invention.

In FIG. 19 there is illustrated another insertion type vortex shedding flowmeter invented by the inventor of the present invention. The bluff body 88 includes a plurality of deep grooves 89, 90, etc. open to the trailing face of the bluff body. A plurality of pressure sensor planels 91, 92, etc. extending from a common root columnar member 93 pivotably supported about a pivoting axis 94, respectively engage the deep grooves 89, 90, etc. The two side walls of each of the deep grooves 89, 90, etc. are respectively open to the two sides 95 and 96 of the bluff body 88 by a plurality of pressure communicating holes disposed through the bluff body 88 around the deep grooves 89, 90, etc. As a consequence, every pressure sensor panel experiences alternating pressure loadings created by the vortices. The pressure loadings on individual pressure sensor panels add up and produce alternating torques about the pivoting axis 94. The torsion sensors of the present invention such as that shown in FIG. 13 connected to the columnar member 93 detect the alternating torques as vortex signals.

The vortex signals detected by the vortex shedding flowmeters are converted to flow variables. The vortex shedding frequency is proportional to the fluid velocity and, consequently, the frequency of the vortex signals times the constant of proportionality determined by calibration yields fluid velocity or volume flow rate. The amplitude of the vortex signals is proportional to the dynamic pressure of the moving fluid. Therefore, the amplitude of the vortex signals divided by the fluid velocity times the constant of proportionality of dynamic pressure determined by calibration yields mass flow rate. The fluid density is obtained as the ratio of mass flow rate to the volume flow rate. There is little doubt that the vortex shedding flowmeter will become one of the most dominating flowmeters in near future. The level of quality of a vortex meter is only as good as that of the impulse sensor employed therein.

While the principles of the present invention have now been made clear by the illustrative embodiments there will be immediately obvious to the skilled in the art many modifications of structures, arrangements, proportions, elements and materials, which are particularly adapted to the specific working environments and operating conditions in the practice of the invention without departing from those principles.

I claim:

1. An apparatus for detecting impulses and forces comprising in combination:
   (a) a container vessel including a cavity surrounded by a thin wall on one side and by rigid walls on other sides;
   (b) an impulse receiving member extending from said thin wall for receiving the impulses and forces acting transversely thereto;
   (c) a first Piezo electric element disposed generally parallel to said thin wall within said cavity adjacent to said thin wall under a pressurized relationship, said first Piezo electric element including an electrode disposed asymmetrically with respect to a plane generally including the central axis of said impulse receiving member and generally perpendicular to a fixed direction transverse to said impulse receiving member, wherein said fixed direction defines the direction of the impulses under measurement;
   (d) a second Piezo electric element disposed generally parallel to said first Piezo electric element within said cavity adjacent to one of said rigid walls under a pressurized relationship, said second Piezo electric element including an electrode disposed symmetrically with respect to said plane; and
   (e) at least two output means respectively connected to the asymmetric electrode of said first Piezo electric element and the symmetric electrode of said second Piezo electric element;

whereby electric signals from said two output means can be combined to cancel noises and extract refined signals.

2. The combination as set forth in claim 1 wherein said thin wall includes a reinforcing rib member disposed on said plane.

3. An apparatus for detecting impulses and forces comprising in combination:
   (a) a container vessel including a cavity surrounded by a thin wall on one side and by rigid walls on other sides;
   (b) an impulse receiving member extending from said thin wall for receiving the impulses and forces acting transversely thereto;
   (c) a pair of Piezo electric elements disposed generally parallel to said thin wall within said cavity adjacent to said thin wall under a pressurized relationship, said pair of Piezo electric elements polarized in two opposite directions and positioned opposite to one another about a plane generally including the central axis of said impulse receiving member and generally perpendicular to a fixed direction transverse to said impulse receiving member, wherein said fixed direction defines the direction of the impulses under measurement, said pair of Piezo electric elements comprising electrodes connected to one another to conduct electricity therebetween;
   (d) a third Piezo electric element disposed generally parallel to said pair of Piezo electric elements within said cavity adjacent to one of said rigid walls under a pressure relationship, said third Piezo electric element including an electrode disposed symmetrically about said plane; and (e) at least two output means respectively connected to said electrodes of said first pair of Piezo electric elements and the symmetric electrode of said third Piezo electric element;

whereby electric signals from said two output means can be combined to cancel noises and extract refined signals.

4. The combination as set forth in claim 3 wherein said thin wall includes a reinforcing rib member disposed on said plane.

5. An apparatus for measuring impulses and forces comprising in combination:

(a) a container vessel including a cavity surrounded by a thin wall on one side and by rigid walls on other sides;

(b) an impulse receiving member extending from said thin wall for receiving the impulses and forces acting transversely thereto;

(c) a first Piezo electric element disposed generally parallel to said thin wall within said cavity adjacent to said thin wall under a pressurized relationship, said first Piezo electric element including an electrode disposed asymmetrically with respect to a first plane generally including the central axis of said impulse receiving member and generally perpendicular to a fixed direction transverse to said impulse receiving member;

(d) a second Piezo electric element disposed generally parallel to said first Piezo electric element within said cavity adjacent to said first Piezo electric element under a pressurized relationship, said second Piezo electric element including an electrode disposed asymmetrically about a second plane generally including the central axis of said impulse receiving member and generally perpendicular to said first plane;

(e) a third Piezo electric disposed generally parallel to said second Piezo electric element within said cavity adjacent to one of said rigid walls under a pressurized relationship, said third Piezo electric element comprising an electrode disposed axisymmetrically about the central axis of said impulse receiving member; and (f) at least three output means respectively connected to the asymmetric electrodes of said first and second Piezo electric elements and the axisymmetric electrode of said third Piezo electric element;

whereby electric signals from said three output means can be combined to cancel noises and extract refined signals.

6. The combination as set forth in claim 5 wherein said combination includes four reinforcing ribs radiating axisymmetrically from said impulse receiving member wherein each of four reinforcing ribs divides angle between said first and second plane into two equal angles.

7. An apparatus for measuring impulses and forces comprising in combination:

(a) a container vessel including a cavity surrounded by a thin wall on one side and by rigid walls on other sides;

(b) an impulse receiving member extending from said thin wall for receiving the impulses and forces acting transversely thereto;

(c) a first pair of Piezo electric elements disposed generally parallel to said thin wall within said cavity adjacent to said thin wall under a pressurized relationship, said first pair of Piezo electric elements polarized in two opposite directions and positioned opposite to one another about a first plane generally including the central axis of said impulse receiving member and generally perpendicular to a fixed direction transverse to said impulse receiving member, said first pair of Piezo electric elements comprising electrodes connected to one another to conduct electricity therebetween;

(d) a second pair of Piezo electric elements disposed generally parallel to said first pair of Piezo electric elements within said cavity adjacent to said first pair of Piezo electric elements under a pressurized relationship, said second pair of Piezo electric elements polarized in two opposite directions and positioned opposite to one another about a second plane generally including the central axis of said impulse receiving member and generally perpendicular to said first plane; said second pair of Piezo electric elements comprising electrodes connected to one another to conduct electricity therebetween;

(e) a fifth Piezo electric element disposed generally parallel to said second pair of Piezo electric elements within said cavity adjacent to one of said rigid wall in a pressurized relationship, said fifth Piezo electric element comprising an electrode disposed axisymmetrically about the central axis of said impulse receiving member; and (f) at least three output means respectively connected to the electrodes of said first and second pair of Piezo electric elements and the axisymmetric electrode of said fifth Piezo electric element;

whereby electric signals from said three output means can be combined to cancel noises and extract refined signals.

8. The combination as set forth in claim 7 wherein said combination includes four reinforcing ribs radiating axisymmetrically from said impulse receiving member wherein each of four reinforcing ribs divides angle between said first and second plane into two equal angles.

* * * * *